(12) United States Patent
Koch

(10) Patent No.: US 9,833,083 B2
(45) Date of Patent: Dec. 5, 2017

(54) OPERATING PART FOR A FURNITURE CONTROL SYSTEM, FURNITURE CONTROL SYSTEM AND ELECTRICALLY ADJUSTABLE FURNITURE

(71) Applicant: LOGICDATA Electronic & Software Entwicklungs GmbH, Deutschlandsberg (AT)

(72) Inventor: Walter Koch, Schwanberg (AT)

(73) Assignee: LOGICDATA ELECTRONIC & SOFTWARE ENTWICKLUNGS GMBH, Deutschlandsberg (AU)

( * ) Notice: Subject to any disclaimer, the term of this patent is extended or adjusted under 35 U.S.C. 154(b) by 298 days.

(21) Appl. No.: 14/443,063

(22) PCT Filed: Oct. 23, 2013

(86) PCT No.: PCT/EP2013/072179
§ 371 (c)(1),
(2) Date: May 14, 2015

(87) PCT Pub. No.: WO2014/075882
PCT Pub. Date: May 22, 2014

(65) Prior Publication Data
US 2015/0305517 A1    Oct. 29, 2015

(30) Foreign Application Priority Data

Nov. 14, 2012   (DE) .................. 10 2012 110 959

(51) Int. Cl.
*A47C 31/00*    (2006.01)
*A47C 20/04*    (2006.01)
*G05B 15/02*    (2006.01)

(52) U.S. Cl.
CPC .......... *A47C 31/008* (2013.01); *A47C 20/041* (2013.01); *G05B 15/02* (2013.01)

(58) Field of Classification Search
CPC ...... A47C 31/008; A47C 20/041; G05B 15/02
(Continued)

(56) References Cited

U.S. PATENT DOCUMENTS 5,646,757 A * 7/1997 Hayashi .............. G02F 1/13334
349/122
6,008,598 A * 12/1999 Luff ..................... A47C 31/008
318/16
(Continued)

FOREIGN PATENT DOCUMENTS

DE    102006055205 A1    6/2008
DE    102008056914 A1    5/2010
(Continued)

*Primary Examiner* — Kawing Chan
(74) *Attorney, Agent, or Firm* — McDermott Will & Emery LLP

(57) ABSTRACT

An operating part for a furniture control system is proposed, having a power supply and at least one electrical drive unit, wherein the operating part comprises a power driver, a detector and an operating field, which are integrated into a common housing. The operating field has at least one operating element, the actuation of which is signaled to the power driver. The power driver is designed to generate a motor voltage for the drive unit based on a low voltage supplied by the power supply and a signaled actuation of the operating element. The detector is coupled to the power driver and is designed to detect a threshold position of the drive unit on the basis of an electrical signal transmitted by the drive unit, and to terminate the generation of the motor voltage if a threshold position is detected.

17 Claims, 3 Drawing Sheets

(58) Field of Classification Search
USPC .......................................................... 318/3
See application file for complete search history.

(56) References Cited

U.S. PATENT DOCUMENTS

| | | | | |
|---|---|---|---|---|
| 6,693,552 | B1* | 2/2004 | Herzig | H01H 9/0214 |
| | | | | 340/13.32 |
| 6,957,461 | B2* | 10/2005 | Osborne | A61G 7/0528 |
| | | | | 5/600 |
| 7,019,241 | B2* | 3/2006 | Grassl | H02N 2/18 |
| | | | | 200/339 |
| 8,638,083 | B2 | 1/2014 | Koch et al. | |
| 8,717,181 | B2* | 5/2014 | Tallent | G08B 21/22 |
| | | | | 340/573.4 |
| 9,552,937 | B2* | 1/2017 | Erdmann | H02K 7/1853 |
| 2003/0094839 | A1* | 5/2003 | Murkey, Sr. | A47C 7/506 |
| | | | | 297/243 |
| 2004/0100169 | A1* | 5/2004 | Huber | A47B 88/457 |
| | | | | 312/319.5 |
| 2004/0133982 | A1 | 7/2004 | Horitani et al. | |
| 2005/0172405 | A1 | 8/2005 | Menkedick et al. | |
| 2005/0218710 | A1* | 10/2005 | Browne | A47C 5/00 |
| | | | | 297/452.64 |
| 2005/0275581 | A1* | 12/2005 | Grassl | H02N 2/18 |
| | | | | 341/173 |
| 2008/0262657 | A1* | 10/2008 | Howell | A47C 20/041 |
| | | | | 700/275 |
| 2009/0012634 | A1* | 1/2009 | Koch | A47C 20/041 |
| | | | | 700/90 |
| 2010/0146704 | A1 | 6/2010 | Barthelt | |
| 2012/0033449 | A1* | 2/2012 | Koch | H02M 1/36 |
| | | | | 363/15 |
| 2012/0138067 | A1 | 6/2012 | Rawls-Meehan | |
| 2013/0169065 | A1 | 7/2013 | Koch et al. | |
| 2015/0305517 | A1* | 10/2015 | Koch | A47C 20/041 |
| | | | | 700/275 |

FOREIGN PATENT DOCUMENTS

| | | |
|---|---|---|
| DE | 102011050161 A1 | 11/2011 |
| DE | 102011102439 A1 | 11/2012 |
| WO | 2008/128250 A1 | 10/2008 |

* cited by examiner

OPERATING PART FOR A FURNITURE CONTROL SYSTEM, FURNITURE CONTROL SYSTEM AND ELECTRICALLY ADJUSTABLE FURNITURE

The invention relates to an operating part for a furniture control system, to a furniture control system having such an operating part, and to an electrically adjustable furniture piece having such a furniture control system and such an operating part.

A number of variants for control systems and operating parts for electrically adjustable furniture are known. In conventional control units, for example, an operating part is known that sends signals to the control system, which converts these signals and actuates motors. In some cases, such control systems merely contain two relays for each motor, which drive the motor depending on the desired rotational direction. It is necessary in this case for the motors to have limit switches, which interrupt the flow of current in an end position.

Other conventional control systems use, for example, motors with Hall sensors so that the position of the motors can be controlled. Thereby the motors can be prevented from running against a stop.

An object to be achieved is that of specifying an improved concept for driving motors in electrically adjustable furniture that can do without an expensive control unit and thereby achieves an increased efficiency.

This object is achieved with the subject matter of the independent claims. Refinements and configurations are subject matter of the dependent claims.

The improved concept is based on the idea of using an operating part to provide the energy necessary for actuating the motors. For this purpose, an appropriate power driver is provided in the operating part. The operating part further provides a detector that can determine an end position of the drive unit even for motors without limit switches or position sensors, in order thereby to disconnect the drive unit from a power supply and prevent overloading of the drive unit. Accordingly an operating part according to the improved concept can also be used for driving less elaborately designed drive units. Thus a simple drive unit can also be used in a furniture control system having such an operating part.

For example, an operating part according to the improved concept is provided for a furniture control system that has a power supply and at least one electrical drive unit. The power supply can be formed by a power adapter, a battery or a combination of a power adapter and a battery. Such an operating part comprises a power driver, a detector and an operating field, which are integrated into a common housing.

The operating field has at least one operating element, in particular at least two operating elements and is designed to signal actuation of the operating element or the operating elements to the power driver. The power driver is designed to generate a motor voltage for the drive unit on the basis of a low voltage delivered by the voltage supply and on the basis of a signaled actuation of the operating element. The detector is coupled to the power driver and is also provided for coupling to the drive unit. The detector is designed to detect a threshold position of the drive unit on the basis of an electrical signal transmitted by the drive unit and to terminate generation of the motor voltage if a threshold position is detected.

No additional control unit is required for such an operating part, since the motor voltage is directly triggered by the actuation of the operating elements. In particular, the motor voltage is supplied to the drive unit as long as the operating element is actuated. The continuing provision of the motor voltage is only suppressed by the detector if the drive unit moves or has moved to an end position or threshold position.

The detector preferably has a sensor for this purpose, which is connected between the power drive and the drive unit in order to measure the motor current. The detector is designed to detect the threshold position of the drive unit when the measured motor current exceeds a threshold value and/or increases faster than a threshold rate of change. This utilizes the property of electrical drive units that the motor current increases when movement is inhibited and voltage is supplied. The sensor for this purpose is a current measuring resistor or a shunt in a feed line from the power driver to the motor, for example.

In some configurations, the operating part is provided for use with a furniture control system in which the drive unit comprises at least one sensor such as a Hall sensor, which is designed to output signal pulses while moving. The detector is designed to detect the threshold position of the drive unit if no signal pulses from the sensor are received during generation of the motor voltage.

In other words, the detector determines that the drive unit is no longer performing any motion, and therefore has reached the threshold position, if there is an absence of pulses from the sensor in the drive unit despite the presence of motor voltage.

In addition, a motor power required by the drive unit is preferably provided directly by the power driver. In other terms, the entire motor current flows via the power driver in the operating part. For example, a low voltage in the form of a DC voltage in the range of several tens of volts, such as 10 V to 30 V, is used as the motor voltage.

In different embodiments, the power driver comprises an H-bridge for generating a motor voltage and a control logic for driving the H-bridge. Such an H-bridge is formed with MOSFET transistors which are connected in an H configuration. The transistors are then driven by the control logic, which evaluates the actuation signals of the operating field.

In different embodiments, the operating elements are formed by electromechanical sensing elements, which are also known from conventional operating parts.

In an alternative embodiment, the operating field has a two-dimensional sensor module with a plurality of proximity-sensitive sensor areas arranged on the sensor module, as well as a button field for covering the plurality of sensor areas. A set of buttons are marked on the button field. The operating field is designed to detect pushing of one of the buttons on the basis of sensor signals that are emitted by the sensor areas. The buttons act as operating elements, by means of which the various functions, particularly a movement of the drive unit, can be controlled.

For example a control module or microcontroller is provided in such an operating field and is coupled electrically to the sensor areas in order to be able to evaluate the corresponding sensor signals of the connected sensor areas. A user of the operating part comes into contact only with the button field when pressing one of the buttons, not with the sensor module or the sensor areas, which are covered by the button field.

Detection of pushing of one of the buttons uses the principle of detecting a proximity of a body part, particularly a finger, relative to one or more of the sensor areas. The sensors formed by the sensor areas are based for example on resistance measurement, surface acoustic wave measurement, capacitive measurement or the like. In different embodiments, the sensor areas each have a capacitive sensor. In particular, it is possible for the sensor areas to be formed by a plurality of electrodes, which are arranged in a grid-like pattern on the sensor module. In this case, each sensor area is preferably formed by one electrode. The sensor areas or electrodes are thus arranged adjoining one another on the sensor module.

The control module or the microcontroller is designed, for example, to detect a change of the capacitance value for each of the sensor areas or electrodes if a user's finger moves over the button field or the sensor module. The capacitance value of each of the electrodes or sensor areas is measured and a position of the finger is determined from the measured capacitances. Not only one capacitance value of one of the sensor areas, but rather a plurality of capacitance values, particularly of adjacent sensors that are situated under one of the buttons on the button field, can be used for determining the position.

The buttons on the button field can be marked by at least one of the following means: printing the switching area, a printed film arranged on the button field or a structured surface of the button field. It is also possible for the button field to be formed by a cloth covering, on which corresponding buttons are marked by printing or embroidery.

In a special configuration, the sensor module is mounted movably in the housing, the operating part having at least one electromechanical switching element that can be actuated by a movement of the sensor module. In particular, the sensor module is provided for axial movement perpendicular or substantially perpendicular to the surface of the button field. A bias tension from one or more springs, for example, is used for support. If the button field or the sensor module is pressed downwards for example, an electrical contact in the electromechanical switching element can be closed thereby. The generation of an actuating signal for the power driver can be made to depend in this case both on the pushing of one of the buttons and on the simultaneous actuation of the electromechanical switching element. It is also possible for different functions to be triggered when the button is pushed, depending on whether the electromechanical switching element has been actuated or not.

In different configurations, the button field forms a cover of the housing. This contributes to further simplification in the manufacturing of the operating part.

In different embodiments, an arbitrary number of sensor areas, limited only by the processing ability of the microcontroller, can be provided on the sensor module without incurring extra costs for keys or equipment of the arrangement. Which of these provided areas is used for a given function depends only on the parameterization of the microcontroller and can be constituted by appropriate design of the surface of the button field, particularly of the marking for the buttons. Because combinations of several sensor areas can be recognized in the detection, a nearly arbitrary position of such a button can be detected in the case of sensor areas arranged close together. In designing the surface of the button field, one is not required to arrange a key directly above the sensor area. This makes it possible to distribute or shift the key arrangement, including functions, on the entire surface of the button field.

Different embodiments of furniture control systems comprise an operating part according to one of the described embodiments, as well as a power supply and at least one electrical drive unit.

In a special embodiment of such a furniture control system, the drive unit has at least one sensor, a Hall sensor for example, which is designed to emit signal pulses when the drive unit moves. The detector of the operating field is designed to detect the threshold position of the drive unit if no signal pulses from the sensor are received during generation of the motor voltage.

In other words, the detector determines that the drive unit is no longer performing any motion, and therefore has reached the threshold position, if there is an absence of pulses from the sensor in the drive unit despite the presence of motor voltage.

A furniture control system of the type described can be used for an electrically adjustable furniture piece, for example. Accordingly, a configuration of an electrically adjustable furniture piece has one of the previously described furniture control systems with one of the described operating parts.

In a special configuration of such an electrically adjustable furniture piece, the operating part is equipped with an operating field having the previously described sensor module. The operating part is installed in the furniture piece underneath a covering such as a cloth, plastic or leather covering, wherein the buttons of the button field are marked on the covering, namely above the sensor module. The operating part is therefore invisible to the user, apart from the marking of the buttons. In addition the use of hard or interfering components for the operating part can be dispensed with, because the operation takes place directly above or on the covering of furniture. The furniture in this case is preferably a chair, an armchair or some other seating furniture, or a bed.

The invention will be described in detail below for several embodiments with reference to figures. Identical reference numbers designate elements or components with identical functions. Insofar as assemblies or components correspond to one another in function, a description thereof will not be repeated in each of the following figures.

Figure 1:
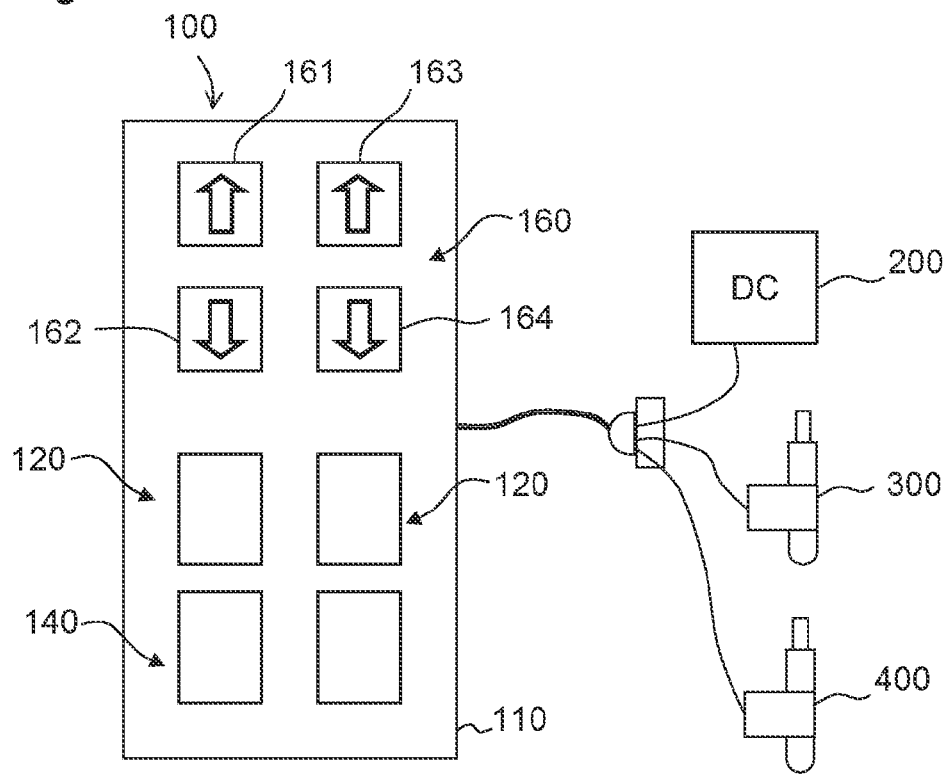
FIG. 1 shows an embodiment of a furniture control system.

FIG. 1 shows an embodiment of a furniture control system having an operating part 100, a power supply 200 and a first and second electrical drive unit 300, 310. The operating part 100 has a housing 110 in which a power driver 120, a detector 140 and an operating field 160 are integrated. Operating elements 161, 162, 163, 164 comprised by the operating field, which ultimately are used for actuating the drive units 300, 310, are arranged on an outer side of the housing 110.

The power supply 200 is designed as a power adapter for example, which converts a line AC voltage into a rectified low-voltage that is supplied to the operating part 100. Alternatively, the power supply 200 can also be provided as a battery that supplies the operating part 100 alone or together with a power adapter. The voltage supplied by the power supply 200 is a low voltage in the range of several tens of volts such as 12 or 24 V.

The drive units 300, 310 are any desired known electrical drive units for adjusting an electrical furniture piece, such as for adjusting the height of a table or an adjustable bed or for adjusting a seating furniture piece. In particular, the drive units 300, 310 are preferably constructed with DC motors.

The power driver 120, which is shown with two blocks in the illustration of FIG. 1 is designed to generate a motor voltage for the drive units 300, 310 on the basis of a low voltage supplied by the power supply. In this embodiment, a separate block is provided for each drive unit, although the drive units can also be supplied by a common power driver. The motor voltage is output to the drive units 300, 310 whenever the operating field 160 signals an actuation of one of the operating elements 161, 162, 163, 164. The power driver 120 comprises a corresponding control logic for this purpose.

The detector 140 in this embodiment has a detector block for each power block to which it is coupled. The detector 140 is additionally coupled to the drive units 300, 310 and is designed to detect a threshold position of this drive unit on the basis of the respective signal transmitted by the drive unit 300 and/or 310. If a threshold position is detected, the generation of the motor voltage for the affected drive unit is ended by appropriate influencing of the power driver 120. Preferably a motor current, which flows between the power driver 120 and the respective drive unit 300, 310, is evaluated.

It should be noted that the entire motor power for the drive units 300, 310 can be provided by means of the power driver 120. For example the low voltage provided by the power supply can be routed directly to the drive unit or units 300, 310 by the power driver 120.

Figure 2:
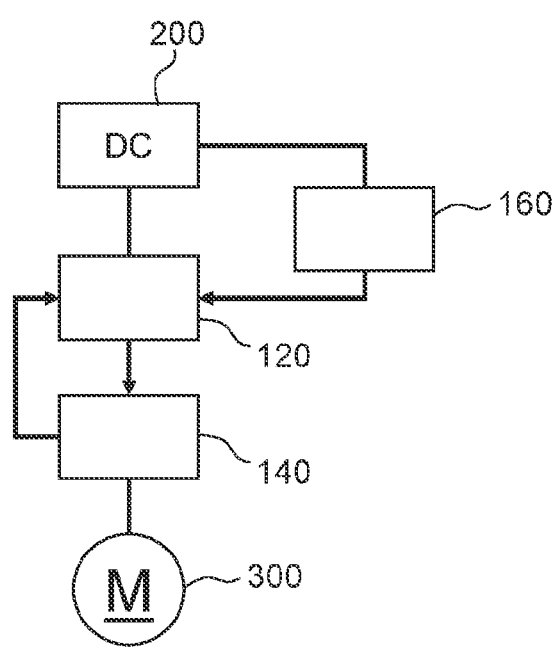
FIG. 2 shows a block schematic diagram of an additional embodiment of a furniture control system.

FIG. 2 shows a block schematic diagram of one embodiment of a furniture control system, in which only one drive 300 is shown for the sake of simplicity. The block schematic diagram comprises blocks for the power supply 200, the operating field 160, the power driver 120, the detector 140 and the drive unit 300. The power supply 200 supplies the power driver 120 with power in order to allow it to generate the motor voltage. In addition, an operating voltage for the operating field 160 is provided by the power supply 200, in order to allow signaling of an actuation of the operating elements, not shown, for example. The actuation signals are issued to the power driver 120.

The power driver 120 outputs the motor voltage to the drive unit 300 via the detector 140. Thereby the detector 140 is able to evaluate the current flowing from the power driver 120 to the drive unit 300. If the motor current assumes an excessively high value and/or rises too quickly, this serves as an indication to the detector 140 of an unusual motor load, which can be inferred to be a movement of the drive unit into a threshold position or a stop. The motor current can be evaluated, based on a threshold current value or a threshold rate of change, for example. If the threshold position is detected by the detector 140, a corresponding signal is issued to the power driver 120, which then terminates generation of the motor voltage for the drive unit 300. Because the threshold position is thus detected only inside the operating part 100 on the basis of the motor current, a simple drive unit 300 can be used, which in particular can dispense with special sensors or other means for detecting an end position.

It is also possible, however, to use a drive unit having a sensor that emits signal pulses during a movement of the drive unit. Such sensor pulses can be used for determining a position for example. Hall sensors can be used as the sensors. If such a drive unit is used, the detector can also determine the threshold position of the drive by the fact that no signal pulses are received from the sensor regeneration of the motor voltage. The sensor signal from the drive unit can be evaluated without actually determining the position, except for the threshold position.

A further effect of the use of the improved concept is that collision of the drive unit with obstacles can be detected and the drive can thus be switched off for the sake of safety.

Figure 3:
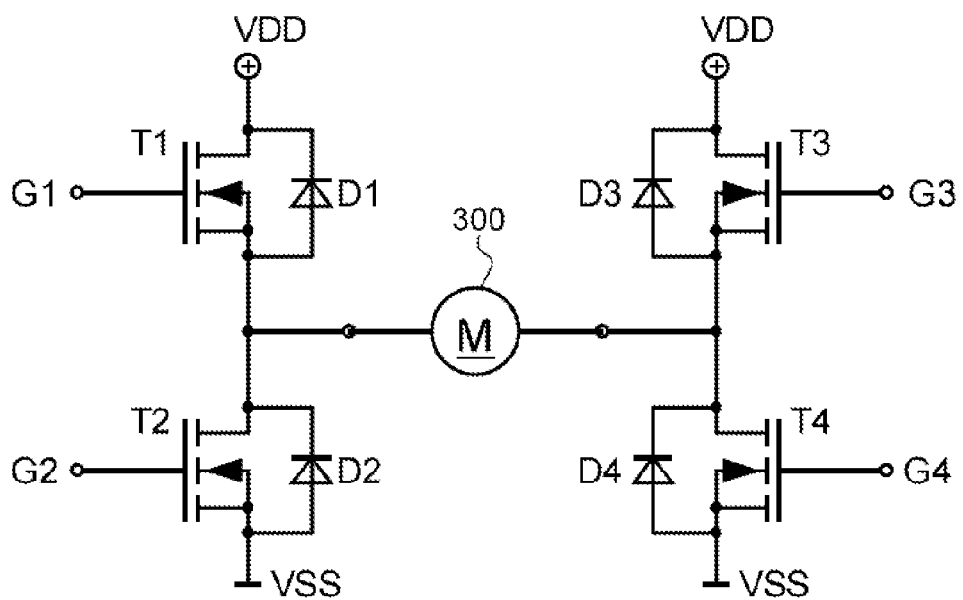
FIG. 3 shows one possible configuration of the detail of a power driver.

FIG. 3 shows a detail of an embodiment of the power driver, which is implemented as a so-called H-bridge. For this purpose, four MOSFET transistors T1, T2, T3, T4 are provided, for which diodes D1, D2, D3, D4 can optionally be provided parallel to the controlled path. In particular, the transistors T1 and T2 or T3 and T4 are respectively connected in series between a positive supply terminal VDD and a negative supply terminal or reference potential terminal VSS, the drive unit 300 being connected between the connecting nodes of the transistors T1, T2 and T3, T4. The transistors T1, T2, T3, T4 are driven via their respective gate terminals G1, G2, G3, G4. The individual transistors of the H-bridge are driven in the known manner to operate a DC motor and therefore the driving will not be further discussed. For example the control signals for the H-bridge according to the improved concept are generated by a control logic that converts the actuating signals of the operating field 160 into corresponding control pulses for the H-bridge. Such a control logic can be implemented by means of a microcontroller for example.

Figure 4:
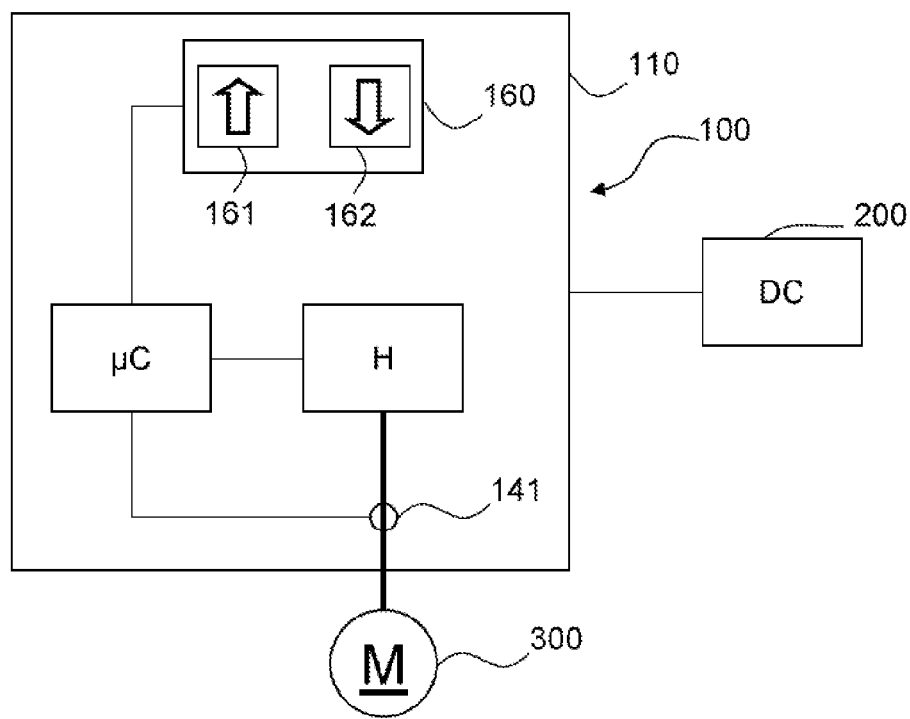
FIG. 4 shows another embodiment of a furniture control system.

A special configuration based on the above for a furniture control system is shown in FIG. 4. An explanation of the fundamentals will be forgone, with reference to the statements regarding FIGS. 1 and 2.

The operating field 160 with two operating elements 161, 162, the actuation signals of which are evaluated by a microcontroller μC, is arranged in the housing 110. The microcontroller μC is additionally connected to the H-bridge in order to generate the corresponding control signals for the transistor circuit. One output of the H-bridge is connected to the drive unit 300, a current sensor 141 that measures the motor current being provided in the current path between the H-bridge and a drive unit 300. This sensor 141 is likewise connected to the microcontroller μC, so that the latter also takes on the function of the detector 140, namely determining the threshold position of the drive unit 300. In particular, functions of the operating field 160, the power driver 120 and of the detector 140 are combined to some extent in the microcontroller μC. Therefore such an operating part of a furniture control system can be produced and operated with low expense.

In place of electromagnetic sensing elements as operating elements 161, 162, 163, 164, touch-sensitive methods for forming the operating elements can also be used. Such a design is shown in FIG. 5 for example, wherein elements relating to the power driver 120 and the detector 140 are not shown for the sake of clarity.

Figure 5:
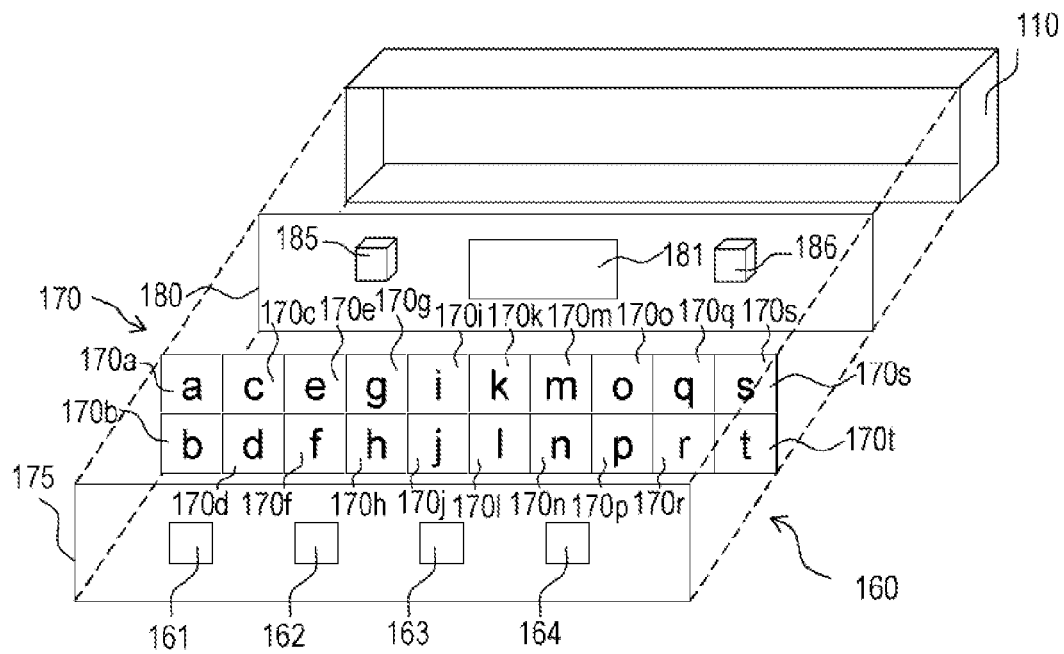
FIG. 5 shows an embodiment of an operating field.

FIG. 5 shows an embodiment of an operating part 100 for a furniture control system, wherein an exploded view is chosen for better clarity. The operating part 100 comprises a button field 175, a sensor module 170 and a control module 180, which are jointly inserted into a housing 110 of the operating part 100. The button field 175 additionally forms a cover of the housing 110.

In the present case, four buttons 161, 162, 163, 164 are marked on the button field 175, wherein the number of buttons is selected only for the sake of example and can be varied as desired. The sensor module 170 is in a two-dimensional shape and has a plurality of proximity-sensitive sensor areas, twenty sensor areas 170a-170t in the present case, which are arranged on the sensor module 170. The number of sensor areas is again only selected for the sake of example and can be varied. The sensor areas 170a-170t are each constructed from one electrode, for example, and form a grid-like arrangement on the sensor module 170. Each of the electrodes can be formed by one or more layers of electrode material. In particular, the sensor areas 170a-170t each comprise a capacitive sensor having the electrodes.

The operating part 100, or the control module 180, has two electromechanical switches 185, 186, which are mounted via springs, not shown, in the housing 110. In the assembled state of the operating part 100, the button field 175 and the sensor module 170 are supported in the housing 110 movably or resiliently by means of the switching elements 185, 186.

The control module 180 has a microcontroller 181, which is designed, among other things, for evaluating sensor signals that are emitted by the sensor areas 170a-170t. The markings of the buttons 161, 162, 163, 164 each cover one or more of the sensor areas 170a-170t, so that for each of the buttons 161, 162, 163, 164, an associated group of sensor areas, covered in whole or in part by the respective button, is formed. Thus pushing of one of the buttons 161, 162, 163, 164 can be detected by evaluating sensor signals that are emitted by the sensor areas 170a-170t, wherein an actuating signal for the power driver 120, not shown, can be generated in the event that an actuation is detected. The function of the microcontroller 181 can be provided by the microcontroller µC from FIG. 4.

If a capacitive detection principle is used for example, absolute capacitance values or relative changes of the capacitance values of the sensor areas can be evaluated in order to detect the approach of a finger, for example, of a user pressing a button. If a finger approaches one of the electrodes or sensitive areas, a small capacitance is formed between the sensor area and the finger and results in a corresponding control signal that is emitted by the sensor area to the control module.

If one of the button fields 175 is actuated during operation of the operating part 100, a corresponding actuation of at least one of the switching elements 185, 186 can optionally be detected, so that the control module 180, or the microcontroller 181, generates an actuation signal only if the actuation of one of the buttons has been detected by evaluation of the sensor signals and one of the switching elements 185, 186 has been actuated. The actuation of the electromechanical switching element 185, 186 is preferably noticeable in a tactile or acoustic manner by the user, for example by a click when the switching element is actuated.

It is possible to combine generation of actuation signals with and without actuation of at least one of the switching elements 185, 186. For example, the control module 180 may be designed to detect an actuation of one of the buttons on the basis of sensor signals that are emitted by the sensor areas 170a-170t, and to generate a first actuation signal for the power driver 120 on the basis of a detected actuation of this button if the switching element 185, 186 has not been actuated, and to generate a second actuation signal for the power driver 120 if the switching element 185, 186 has been actuated.

In addition, a display device such as a multi-digit segment display, not shown, can be provided in the operating part 100 and mounted on the control module 180 for example. The sensor module 180 preferably has an appropriate cutout through which the display device can protrude. A corresponding transparent area, which makes the display device visible from the exterior, is also provided in the button field 175. Operating parameters or current settings or other information can be displayed by means of the display device. In such an embodiment having a display element for example, a setting or function associated with one of the actuated buttons can be displayed when the first actuation signal is generated, and the setting or function associated with the actuated button can be made or performed when the second actuation signal is generated.

Figure 6:
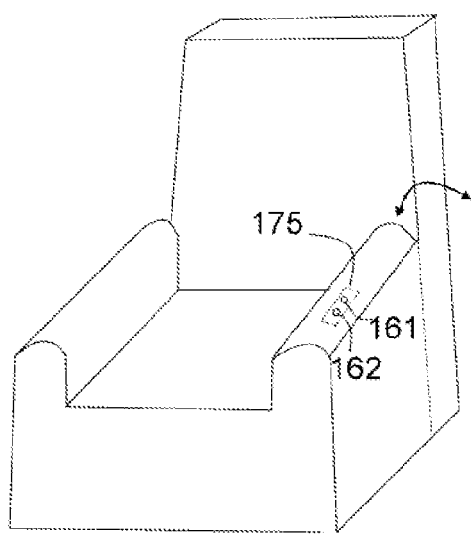
FIG. 6 shows an embodiment of an electrically adjustable furniture piece.

FIG. 6 shows a particular design of an electrically adjustable furniture piece, which is shown for the sake of example as an armchair. The armchair is covered with a covering of cloth, plastic leather or the like. An operating part, not visible, is integrated into the armrest of the armchair, wherein a button field 175, in which the buttons 161, 162 are visually marked according to the embodiment described in FIG. 5, is provided on the covering of the armrest for example. The marking is done for example by printing, embroidery or other known possibilities for marking materials. If the operating elements 161 or 162 are actuated, the angle of the backrest of the armchair can be adjusted, for example. Thus, despite the adjustability of the armchair, a favorable visual overall impression of the armchair and comfort for user of the armchair can be achieved without an additional operating part having to be provided. It goes without saying that the exact position of the operating part in the armchair and/or the positioning of the button field 175 on the armchair can be varied.

The invention claimed is:

1. A manual operating part for a furniture control system having a power supply and at least one electrical drive unit for adjusting a piece of furniture, the manual operating part comprising:
   a power driver, a detector and an operating field that are integrated into a common housing,
   wherein the operating field has at least one operating element and is designed to signal an actuation of the at least one operating element to the power driver,
   wherein the power driver is designed to generate a motor voltage for the drive unit on the basis of a low voltage provided by the power supply if an actuation of the at least one operating element is signaled by the operating field, and
   wherein the detector is coupled to the power driver and is configured for being coupled to the drive unit, and is designed to detect a threshold position of the drive unit on the basis of an electrical signal transmitted by the drive unit, and to terminate the generation of the motor voltage upon detection of the threshold position.

2. The manual operating part according to claim 1, wherein the detector has a sensor that is electrically connected between the power driver and the drive unit in order to measure the motor current and is designed to detect the threshold position of the drive unit if the measured motor current exceeds a threshold value and/or rises faster than a predetermined threshold rate of change.

3. The manual operating part according to claim 1, which is provided for use with a furniture control system, wherein the drive unit comprises at least one sensor, particularly a Hall sensor, which is designed to emit signal pulses during a movement of the drive unit, and
   wherein the detector is designed to detect the threshold position of the drive unit if no signal pulses from the sensor are received during generation of the motor voltage.

4. The manual operating part according to claim 1, wherein a motor power required by the drive unit is provided directly by the power driver.

5. The manual operating part according to claim 1, wherein the power driver comprises an H-bridge for generating the motor voltage and a control logic for driving the H-bridge.

6. The manual operating part according to claim 1, wherein the at least one operating element is formed by electromechanical switches.

7. The manual operating part according to claim 1, wherein the operating field comprises a two-dimensional sensor module having a plurality of proximity-sensitive sensor areas arranged on the sensor module and a button field for covering the plurality of sensor areas,
- wherein a set of buttons is marked on the button field, and
- wherein the operating field is designed to detect an actuation of one of the buttons on the basis of signals that are output by the sensor areas.

8. The manual operating part according to claim 7, wherein the sensor module is movably mounted in the common housing, and
- wherein the operating part has at least one electromechanical switching element that can be actuated by a movement of the sensor module.

9. The manual operating part according to claim 7, wherein the button field forms a cover of the common housing.

10. A furniture control system comprising:
a manual operating part;
a power supply; and
at least one electrical drive unit for adjusting a furniture piece,
the manual operating part comprising a power driver, a detector and an operating field that are integrated into a common housing,
wherein the operating field has at least one operating element and is designed to signal an actuation of the at least one operating element to the power driver,
wherein the power driver is designed to generate a motor voltage for the drive unit on the basis of a low voltage provided by the power supply if an actuation of the at least one operating element is signaled by the operating field, and
wherein the detector is coupled to the power driver and is configured for being coupled to the drive unit, and is designed to detect a threshold position of the drive unit on the basis of an electrical signal transmitted by the drive unit, and to terminate the generation of the motor voltage upon detection of the threshold position.

11. The furniture control system according to claim 10, wherein the drive unit comprises at least one sensor, particularly a Hall sensor, which is designed to emit signal pulses during a movement of the drive unit, and
- wherein the detector is designed to detect the threshold position of the drive unit if no signal pulses from the sensor are received during generation of the motor voltage.

12. An electrically adjustable furniture piece having a furniture control system according to claim 10, wherein the operating part is installed in the furniture piece under a covering,
- wherein the operating field comprises a two-dimensional sensor module having a plurality of proximity-sensitive sensor areas arranged on the sensor module and a button field for covering the plurality of sensor areas,
- wherein a set of buttons of the button field are marked on the covering, and
- wherein the operating field is designed to detect an actuation of one of the buttons on the basis of signals that are output by the sensor areas.

13. The furniture piece according to claim 12, wherein the sensor module is movably mounted in the common housing, and
- wherein the operating part has at least one electromechanical switching element that can be actuated by a movement of the sensor module.

14. The furniture piece according to claim 12, wherein the button field forms a cover of the common housing.

15. The furniture control system according to claim 10, wherein the operating field comprises a two-dimensional sensor module having a plurality of proximity-sensitive sensor areas arranged on the sensor module and a button field for covering the plurality of sensor areas,
- wherein a set of buttons is marked on the button field, and
- wherein the operating field is designed to detect an actuation of one of the buttons on the basis of signals that are output by the sensor areas.

16. The furniture control system according to claim 15, wherein the sensor module is movably mounted in the common housing, and
- wherein the operating part has at least one electromechanical switching element that can be actuated by a movement of the sensor module.

17. The furniture control system according to claim 15, wherein the button field forms a cover of the common housing.

* * * * *